United States Patent
Dominguez Romero et al.

(10) Patent No.: US 8,718,655 B2
(45) Date of Patent: May 6, 2014

(54) CELL BARRING IN A CELLULAR COMMUNICATION NETWORK

(75) Inventors: Francisco Javier Dominguez Romero, Madrid (ES); Kyriakos Exadactylos, Madrid (ES); Andrea De Pasquale, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 733 days.

(21) Appl. No.: 12/637,616

(22) Filed: Dec. 14, 2009

(65) Prior Publication Data

US 2010/0240376 A1 Sep. 23, 2010

(30) Foreign Application Priority Data

Dec. 12, 2008 (ES) .................................. 200803534

(51) Int. Cl.
*H04W 40/00* (2009.01)

(52) U.S. Cl.
USPC ........ 455/445; 455/423; 455/435.1; 455/410; 455/560; 455/458; 455/435.2; 455/432.1; 455/517; 455/428

(58) Field of Classification Search
USPC .............. 455/445, 423, 435.1, 410, 560, 458, 455/517
See application file for complete search history.

(56) References Cited

U.S. PATENT DOCUMENTS

| | | | | |
|---|---|---|---|---|
| 7,266,381 | B2* | 9/2007 | Charles | 455/456.4 |
| 2002/0197992 | A1* | 12/2002 | Nizri et al. | 455/435 |
| 2003/0050097 | A1* | 3/2003 | Amirijoo et al. | 455/560 |
| 2007/0037577 | A1* | 2/2007 | Dalsgaard et al. | 455/436 |
| 2008/0200146 | A1* | 8/2008 | Wang et al. | 455/410 |
| 2009/0116377 | A1* | 5/2009 | Nylander et al. | 370/216 |
| 2009/0285170 | A1* | 11/2009 | Rangaiah | 370/329 |
| 2010/0099402 | A1* | 4/2010 | Wu | 455/423 |

FOREIGN PATENT DOCUMENTS

| | | |
|---|---|---|
| EP | 2 117 277 | 11/2009 |
| WO | 03/043364 | 5/2003 |

OTHER PUBLICATIONS

Vodafone: "Barred cell due to network authentication failure," 3GPP Draft; GP-030319, 3rd Generation Partnership Project (3GPP), Mobile Competence Centre; 650, Route Des Lucioles; F-06921 Sophia-Antipolis Cedex; France, vol. TSG GERAN, no. San Antonio, Texas; 20030204, Feb. 4, 2003, XP050007594.
European Search Report issued on Feb. 15, 2010 in connection with corresponding European Patent Application No. 09179017.0-1525.

* cited by examiner

*Primary Examiner* — Khalid Shaheed
(74) *Attorney, Agent, or Firm* — Workman Nydegger

(57) ABSTRACT

Cell barring in a cellular communication network is used in case of a failure in the core network of the cellular communication network or on the interface between the core network and the radio access network. By barring at least a part of the cells of the network, the UEs camping on these cells are triggered to reselect another cellular communication network in case of a service interruption.

23 Claims, 4 Drawing Sheets

CELL BARRING IN A CELLULAR COMMUNICATION NETWORK

BACKGROUND OF THE INVENTION

1. Technical Field

The present invention relates to a method for use in a cellular communication network as well as to a corresponding cellular communication network.

2. Description of Related Art

In existing third generation (3G) cellular networks if the connection (Iu interface) between the Radio Network Controller (RNC) and Core Network fails or if there is an outage in the Core Network, the customers do not get any service. More importantly, they normally will not be aware of this situation, because their user equipments (UE) are still camping on the 3G network as the radio access network is still radiating system information elements. So, in cases of Iu breakdown or Core Network outage due to whatever reason, the RNC keeps providing coverage but no service to the UEs under its control. This means that these UEs are camping on the 3G network but they cannot access the network for service.

One possibility to overcome this problem would be to switch the RNC off. This would have as a result that most UEs in the coverage area of the RNC select an alternative cellular communication network to connect to, if available, for example a second generation (2G) cellular network. Furthermore, the UEs that are not able to select another network, for example because the alternative network does not permit them to be connected, would at least be aware that there is no service, because the radio access network would not be radiating any system information elements. However, a high number of UEs would attempt to select the alternative cellular communication network at the same time, resulting in many simultaneous Location Update Requests/Routing Area Update Requests sent to the alternative cellular communication network. This must be avoided since it could lead to congestion. In case of a 2G network, the congestion could occur either in the Base Station System (BSS) part due to Stand-alone Dedicated Control Channel (SDCCH) congestion or in the Mobile Switching Centre (MSC) or Serving GPRS Support Node (SGSN). In this latter case, the overload is caused by the high number of simultaneous Location Update/Routing Area Update procedures to be processed by these nodes. A further drawback of this solution is that the RNC of the network with the fault condition should be started up, again when the fault condition is over. Such a start up procedure generally is quite complicated and may therefore take a long time and/or result in further faults.

SUMMARY OF THE INVENTION

Embodiments of the invention are directed to methods and corresponding cellular communication networks that address one or more of the above mentioned problems.

According to one embodiment, at least a part of the cells of a cellular communication network are barred, in case of a failure in the cellular network's core network or on the interface between the core network and the cellular network's radio access network. A disclosed method is based on the recognition that, at the time of occurrence of the failure, it is well possible that another cellular communication network with the same coverage or an overlapping coverage is still working fine. By barring cells of the cellular communication network with the failure, UEs camping on these cells are triggered to perform a reselection to the correctly working cellular communication network.

The barring of the cell may be performed by setting an indication on a broadcast channel of the cell to cell barred, as is known per se.

When the fault condition is over, the barred cells are unbarred. This step may be performed by setting the information element on the broadcast channel of the concerned cell to the "not barred" state. As a result no complicated start-up procedures are needed when the fault has been solved.

In one embodiment, the cells of the cellular communication are divided in a plurality of clusters and the barring of cells belonging to different clusters takes place at different points in time. In this way, an overload of registrations to the alternative cellular communication network is avoided upon occurrence of a fault.

A convenient way of barring cells belonging to different clusters at different times is by barring all cells in a first cluster, waiting for a predetermined time period, barring all cells of a second cluster, again waiting for the predetermined time, barring all cells of a third cluster, etc. As a result, the registration procedures of the UEs located in cells belonging to the different clusters will also be spread in time.

In disclosed embodiments, the sequential barring process continues until all cells under control of a control node of the radio access network have been barred.

The failure may be automatically detected and the barring method according to the present invention may be automatically initiated upon detection of a failure, for example by a control node in the radio access network. Alternatively, the barring method according to the present invention is initiated by a human operator after occurrence of a fault.

When the fault condition is over, the barring process is stopped. The barred cells can be made available again following the same sequential mechanism as used for barring, i.e. by unbarring all cells of one cluster every predetermined number of seconds in order to avoid registration overload in the original cellular communication network.

The barring method according to disclosed embodiments may be used for all kinds of cellular communication networks, such as 2G, 3G and future fourth generation (4G) networks.

In disclosed embodiments, exemplary methods are implemented by means of a computer program loaded to a control node of the radio access network.

In another disclosed embodiment, a cellular communication network is provided comprising a core network and a radio access network having a plurality of cells, the radio access network having a coverage that is at least partially overlapping with another radio access network, and wherein it comprises barring means adapted for barring at least a part of the cells, in case of a failure in the core network or on the interface between the core network and the radio access network.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF EXAMPLE EMBODIMENTS

Figure 1:
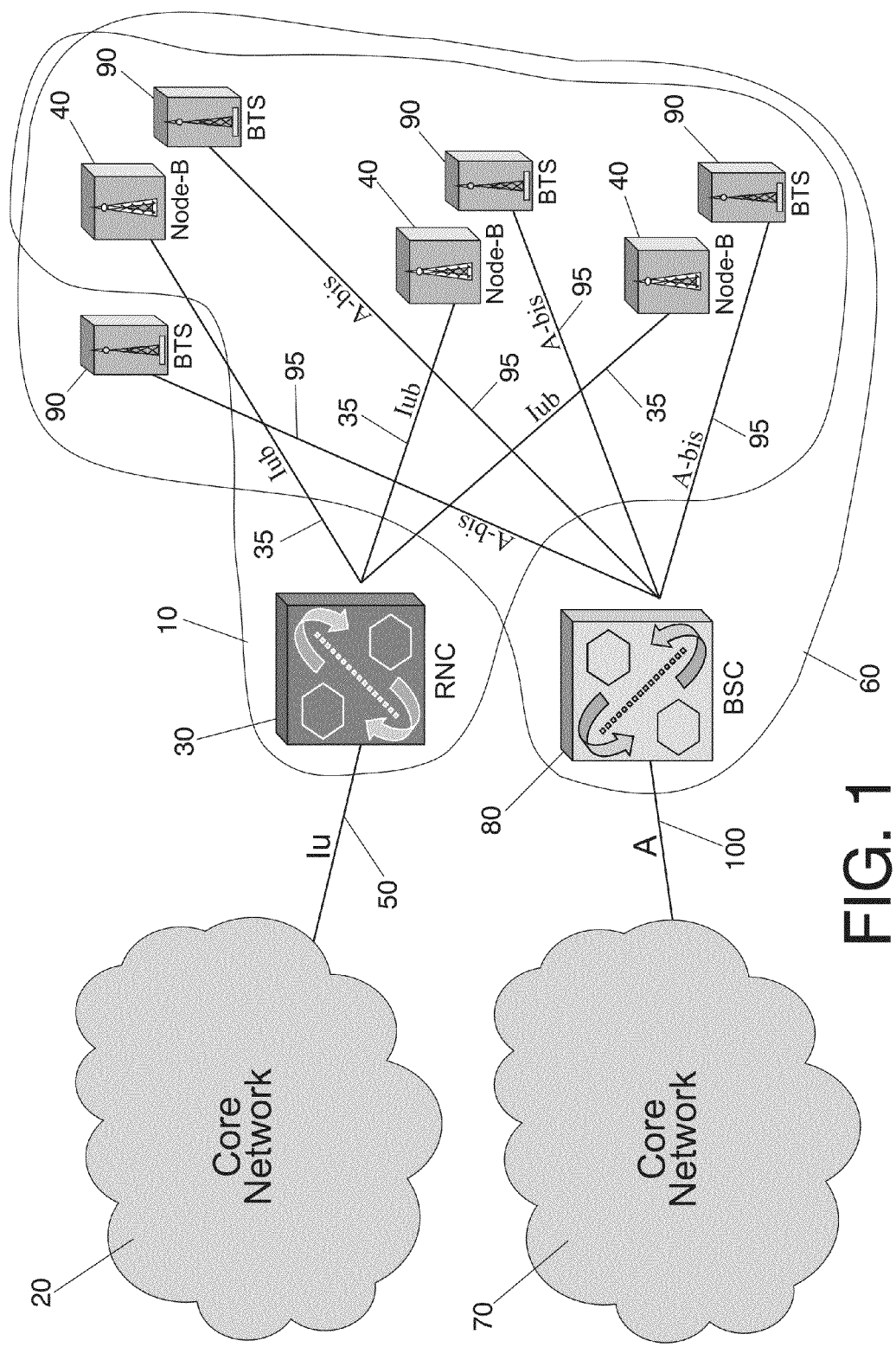
FIG. 1 shows an architecture of a third generation cellular communication network wherein the present invention may be implemented and a second generation cellular communication network with overlapping coverage.

FIG. 1 shows an exemplary architecture of a third generation (3G) cellular communication network wherein embodiments of the present invention may be implemented. Only the elements necessary for understanding the present invention are shown. The 3G network comprises a radio access network 10 and a core network 20. The Radio Access Network comprises Radio Network Control Nodes (RNC) 30, of which only one is shown and a plurality of nodes-B 40, providing radio coverage to respective cells. The RNC 30 and Nodes-B 40 are connected to each other by means of Iub interfaces 35. The nodes-B 40 communicate with user equipments (UE) located in the respective cells. When the UEs are in the idle mode or in inactive connected mode, i.e. they are not involved in a communication with the network they listen to system information elements that are transmitted by the node-B 40 of the cell they are in, on a broadcast channel of the cell. This situation is also referred to as "camping" on the cell.

The radio access network 10 and the core network 20 are connected by means of the Iu interface 50. If the connection between the core network 20 and the radio access network 10 fails or if there is an outage in the core network 20, the UEs camping on the cells of the network will not get any service. Meanwhile the UEs remain connected to ("camping on") the network, because the radio access network 10 keeps transmitting system information elements to the UEs in its coverage area.

Generally, the radio coverage area of cellular communication networks nowadays overlaps at least partially with the radio coverage area of one or several other radio access technologies. Such a situation is shown in FIG. 1, where the coverage area of the radio access network 60 of a second generation (2G) cellular communication network overlaps with the coverage area of the 3G cellular communication network, described herein above. The radio access network 60 of the 2G network is connected to the core network 70 thereof by means of the A interface 100. The Radio Access Network comprises Base Station Controllers (BSC) 80, of which only one is shown and a plurality of Base Transceiver Stations (BTS) 90, providing radio coverage to respective cells. The BSC and BTSs are connected by means of A-bis interfaces 95.

All nodes shown in FIG. 1 are well known to the skilled person and therefore there is no need to describe them in more detail here. They are interconnected by means of standardized interfaces, some of which are indicated in the figure. Also, these interfaces are well known to the skilled person. Furthermore, it should be understood that the architecture shown in FIG. 1 is exemplary and that the invention can be applied in cellular communication networks having other architectures as well.

In case that there is a failure in the 3G communication network, such as a failure in the connection between the radio access network 10 and the core network 20 or an outage in the core network, it is desirable that the UEs camping on cells of the 3G network connect to another cellular communication network providing coverage in their location, such as the 2G network, described herein above. According to an embodiment of the present invention, in order to trigger such a network reselection by the UEs, the RNC performs the algorithm shown in FIG. 2.

When an Iu breakdown or core network outage 200 occurs, this failure is detected 210 by the RNC and an outage situation is declared 220. The RNC can detect the Iu failure monitoring the interface by sending packets and receiving ACK to check if the interface is up. It is also possible to check if there is data traffic working through the Core Network.

After declaring the outage situation, a cell barring procedure is started. Alternatively, the triggering of the start of the cell barring procedure is manual. The cells that are under control of the RNC have been previously organized in a plurality of clusters 230. The size of each cluster may vary from a single cell to all cells that are under control of the RNC. The cell barring procedure is as follows. First, all cells belonging to a first cluster are barred 240. This may be achieved by transmitting a cell barred indication on a broadcast channel of each affected cell by the corresponding node-B (see 3GPP TS 25.331). The cell barred indication message is periodically transmitted in the System Information Type 4. If the barring process has not been finished, i.e. not all clusters under control of the RNC have been barred, the process waits 250 for a certain waiting time (indicated in the figure by parameter "TimeCellBar") before repeating the barring step 240 for a next cluster, and so on. The waiting time is a parameter, which is configurable by the network operator. A suitable value for this parameter is for example 1 s. The barring step 240 is repeated until the cells of all clusters under control of the RNC have been barred 260.

The UEs located in a barred cell, upon receiving the cell barred indication, are triggered to search for other cells to connect to, which in the example of FIG. 1 is the 2G radio access technology (RAT). By sequentially barring different clusters of cells of the 3G network, the UEs located in different clusters attempt to register to the 2G network at different times. In this way, the Location or Routing Area Update Requests of all UEs are spread over a certain time, thereby reducing the risk of overload or congestion in the 2G network.

As soon as the RNC detects that the failure has been solved 270, the barred cells shall be set to "not barred" 280 making them available again for UEs. Preferably, the cells are unbarred sequentially, cluster by cluster, using as waiting time between the unbarring of two clusters the parameter "TimeCellBar". In this way, registration overload in the 3G network is avoided. The "un-barring" of a cell is achieved by setting the information element on the broadcast channel of the concerned cell to the "not barred" state. Finally, the end of the outage situation is declared 290.

Figure 2:
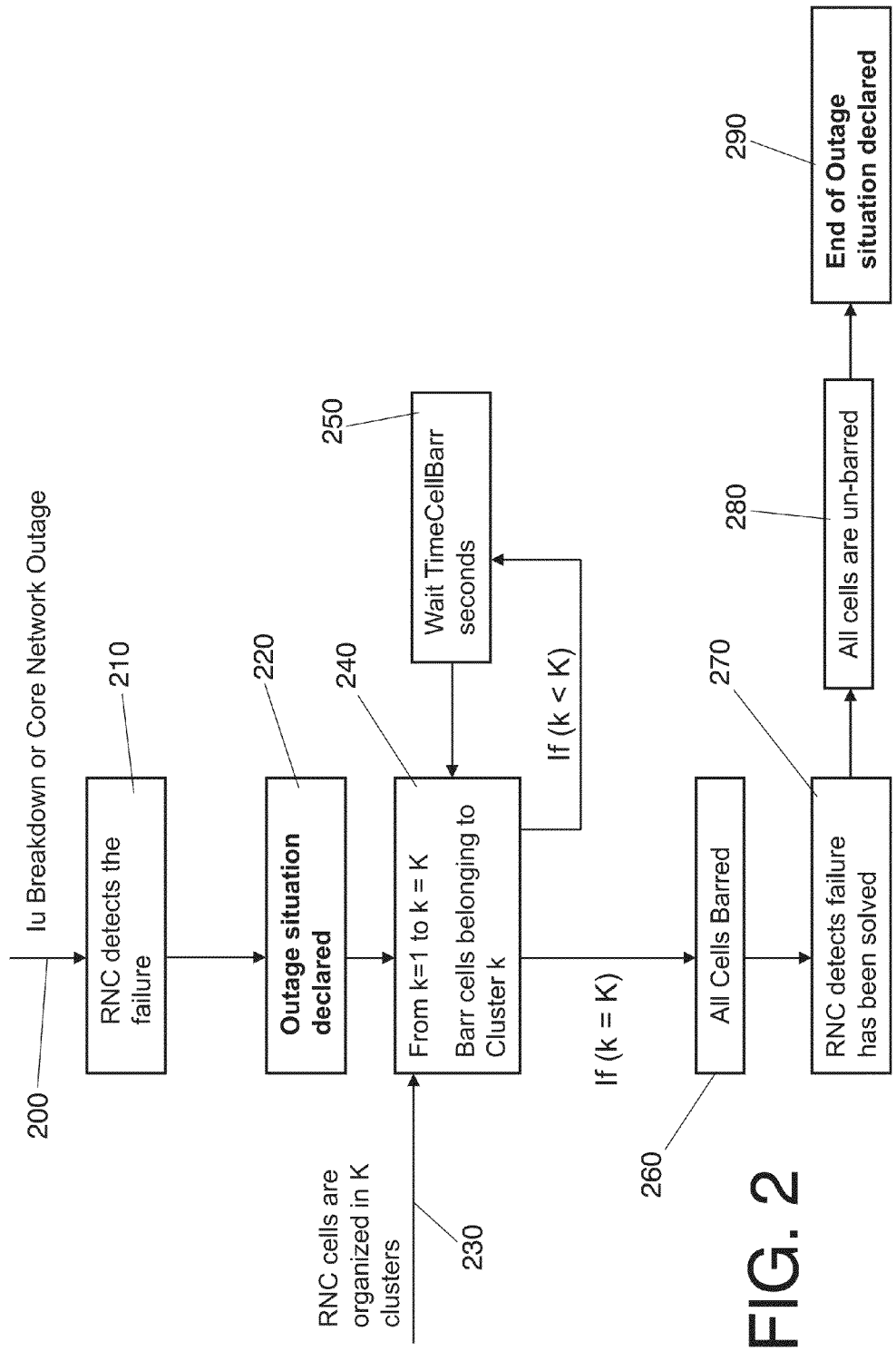
FIG. 2 shows a flowchart of a method according to an embodiment of the present invention.
Figure 3:
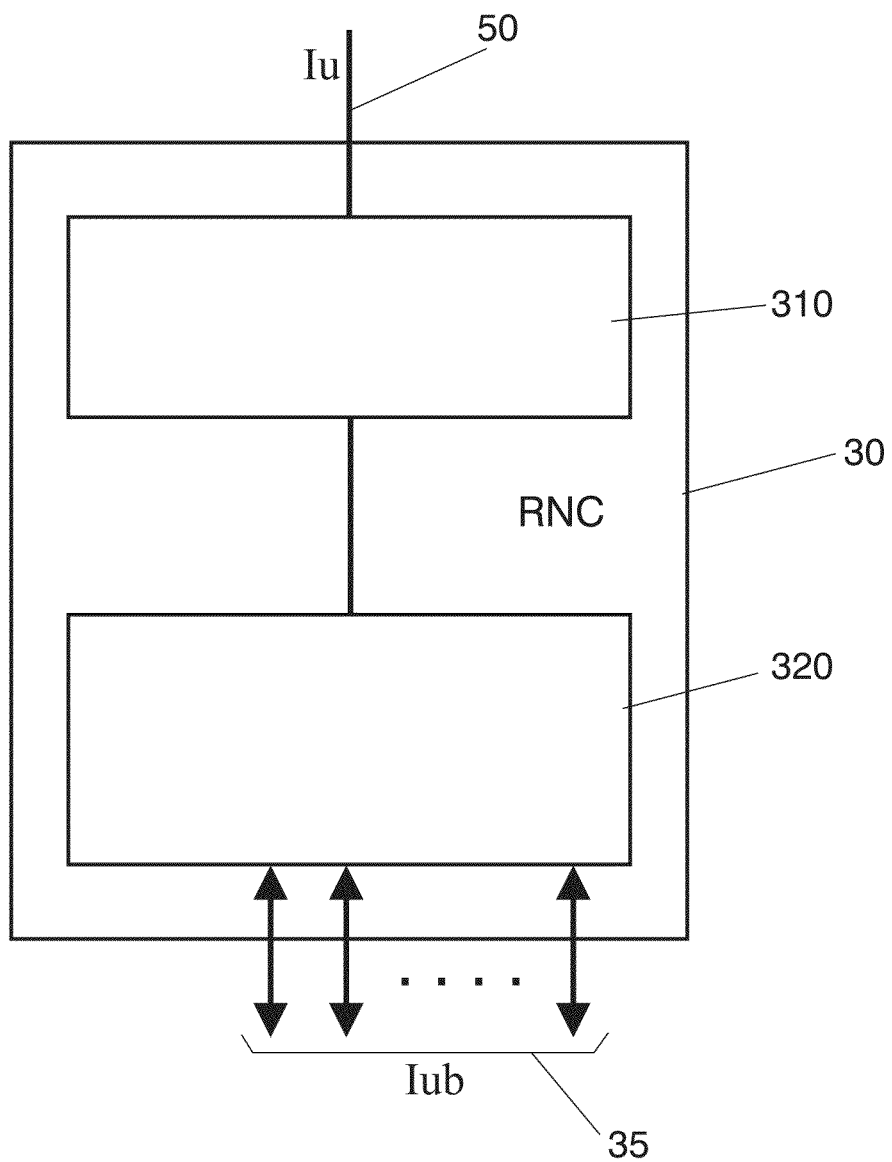
FIG. 3 shows a block diagram of a control node adapted for implementing the flowchart depicted in FIG. 2.

In order to implement the functionality depicted in FIG. 2, the RNC 30 needs to be provided with detection means 310 and barring means 320 as shown in FIG. 3. Also in FIG. 3, only the elements necessary for understanding the present invention are shown. The detection means 310 are adapted for performing steps 210, 220, 270 and 290. The barring means 320 are adapted for performing steps 240, 250, 260 and 280. The detection means 310 and the barring means 320 are preferably implemented by a processor and a corresponding storage loaded with a suitable computer program. The rest of the network nodes of the 3G network as well as the UEs may be standard apparatuses. Only signalling messages that are already defined in the applicable standards may be used, there is no need to use proprietary signalling messages or to standardize new signalling messages to implement the present invention.

While the invention has been illustrated and described in detail in the drawings and foregoing description, such illustration and description are to be considered illustrative or exemplary and not restrictive; the invention is not limited to the disclosed embodiments.

The present invention is applicable to other combinations of radio access technologies of a cellular network where (at least) one of the RAT provides an overlapping coverage layer. In that case users camped on the out of order system can be targeted with the cell barring procedure as described above in order to move them to the other overlapping coverage cellular network.

More specifically, the present invention has applicability, but is not limited to, the following cellular network combinations:

| Outage network part | Barring | Move users to another network part |
|---|---|---|
| 3G network (e.g. UMTS) | Users camped on 3G network | 2G |
| 2G network (e.g. GSM) | Users camped on 2G network | 3G |
| 2G network (e.g. GSM) | Users camped on 2G network | 4G |
| 4G network (e.g. LTE network) | Users camped on LTE network | 3G |
| 4G network (e.g. LTE network) | Users camped on LTE network | 2G |

In case that the cell barring procedure is implemented in a 2G network, the necessary functionality may be implemented by a suitable computer program loaded to the BSC 80.

Figure 4:
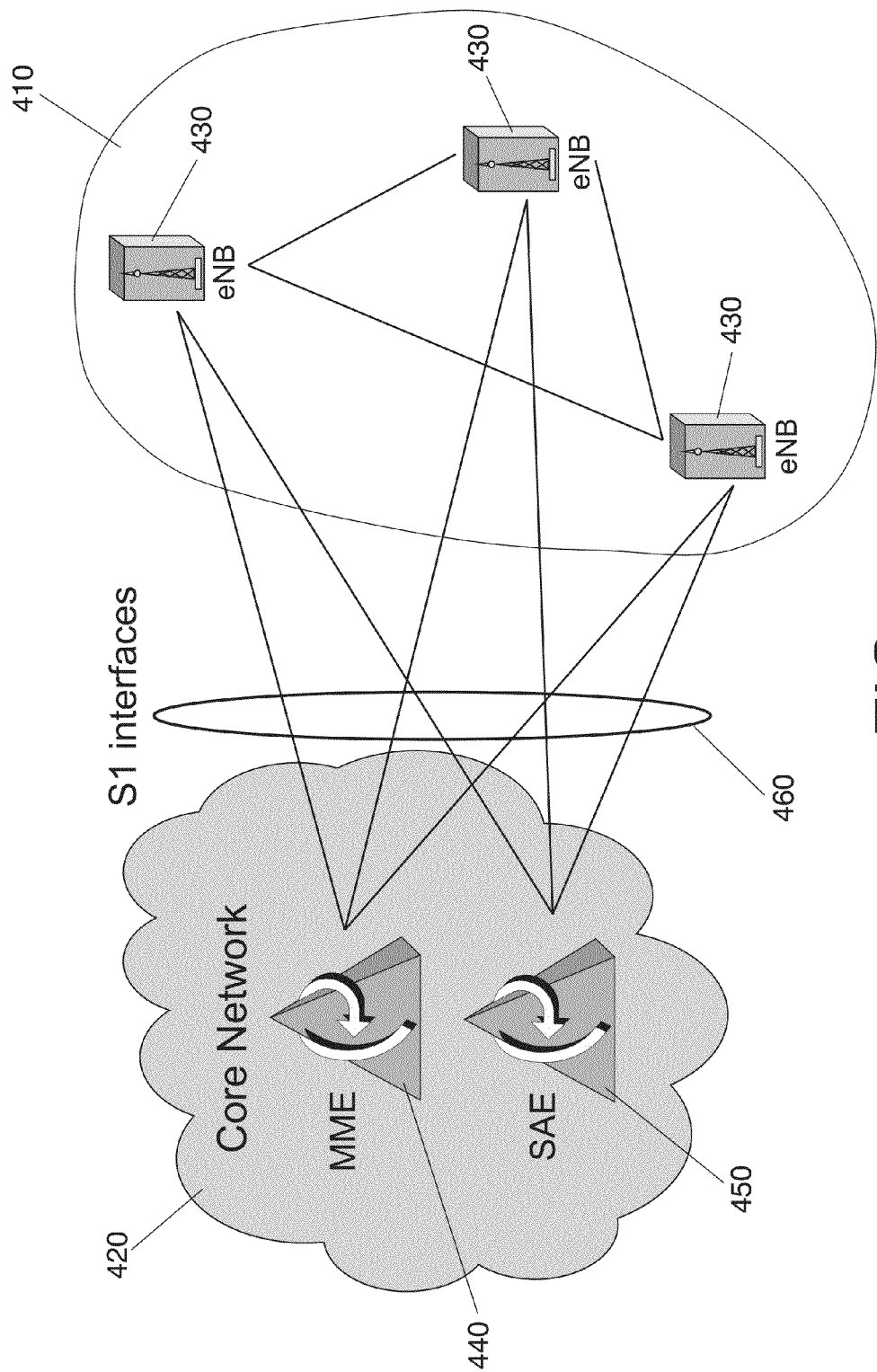
FIG. 4 shows an architecture of a fourth generation cellular communication network known as Long Term Evolution (LTE) wherein the present invention may be implemented.

An exemplary architecture of a Long Term Evolution (LTE) cellular network currently being standardized and also often referred to as the fourth generation (4G) cellular network is shown in FIG. 4. It comprises a radio access network 410 and a core network 420 being connected by means of S1 interfaces 460. The radio access network comprises a plurality of Evolved Nodes-B (eNB) 430. The core network comprises a Mobility Management Entity (MME) 440 and a System Architectural Evolution (SAE) 450. In case that the cell barring procedure is implemented in such a LTE network, the necessary functionality may be implemented by a suitable computer program loaded to one or more of the eNBs. The procedure is exactly the same as in 3G or 2G, so by means of setting the cell barred indication in the system information messages.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms. Any reference signs in the claims should not be construed as limiting the scope.

The invention claimed is:

1. A method comprising:
   at a first controller, detecting a failure in a core network of a first cellular communication network or on an interface between the core network and a first radio access network of the first cellular communication network, the first radio access network having a plurality of cells and one or more controllers, the core network communicating with the first radio access network via the one or more controllers, the first controller being one of the one or more controllers;
   barring one or more of the cells of the first radio access network in response to the detection of the failure; and
   connecting a user equipment (UE) located in one of the barred cells of the first cellular communication network to a cell of a second radio access network of a second cellular communication network, the second radio access network of the second cellular communication network overlapping the first radio access network of the first cellular communication network,
   wherein the cells of the first radio access network are divided into at least first and second clusters and wherein barring one or more of the cells of the first radio access network comprises barring cells of the first and second clusters at different points in time,
   wherein barring cells of the first and second clusters at different points in time comprises:
   barring all cells of the first cluster;
   waiting for a predetermined time period; and
   barring all cells of the second cluster.

2. The method according to claim 1, wherein barring one or more of the cells of the first radio access network comprises barring all of the cells under control of the first controller.

3. The method according to claim 1, wherein barring one or more of the cells of the first radio access network comprises setting an information element on a broadcast channel of each of the one or more cells to indicate a barred state.

4. The method according to claim 1, wherein detecting the failure is performed automatically at the first controller.

5. The method according to claim 1, further comprising:
   at the first controller, determining that the failure in the core network or on the interface between the core network and the first radio access network has been resolved; and
   unbarring the barred cells of the first radio access network in response to the determination of the resolution of the failure.

6. A cellular communication network comprising:
   a core network;
   a radio access network comprising:
      a plurality of cells; and
      one or more controllers, the core network communicating with the radio access network via the one or more controllers; and
   barring means for barring one or more of the cells of the radio access network when a failure is detected in the core network or on an interface between the core network and the radio access network,
   wherein the cells are divided into at least first and second clusters,
   the barring means is configured to bar cells of the first and second clusters at different points in time, and
   the barring means is configured to bar all cells in the first cluster, wait for a predetermined time period, and then bar all cells of the second cluster.

7. The cellular communication network according to claim 6, wherein the barring means are located in a first one of the controllers of the radio access network and wherein the barring means are configured to bar all cells under control of the first controller.

8. The cellular communication network according to claim 6 wherein the barring means bars the one or more cells by setting an indication on a broadcast channel of each of the one or more cells to be barred.

9. The cellular communication network according to claim 6, further comprising detection means for automatically detecting the failure in the core network or on the interface between the core network and the radio access network.

10. The cellular communication network according to claim 6 wherein the barring means is configured to unbar the one or more barred cells when the failure in the core network or on the interface between the core network and the radio access network has been resolved.

11. The method according to claim 1, wherein detecting the failure in the core network or on the interface between the core network and the first radio access network comprises:
   at the first controller, sending a packet to the core network; and
   at the first controller, failing to receive an acknowledgment from the core network for the sent packet.

12. The method according to claim 1, wherein the first cellular communication network comprises a second generation (2G) cellular communication network and the first controller comprises a Base Station Controller (BSC).

13. The method according to claim 1, wherein the first cellular communication network comprises a third generation (3G) cellular communication network and the first controller comprises a Radio Network Controller (RNC).

14. The method according to claim 1, wherein the first cellular communication network comprises a fourth generation (4G) cellular communication network and the first controller comprises an Evolved Node-B (eNB).

15. The method according to claim 14, wherein the core network comprises a Mobility Management Entity (MME) and a System Architectural Evolution (SAE).

16. The method according to claim 5, wherein unbarring the barred cells comprises setting an information element on a broadcast channel of each of the barred cells to indicate a not-barred state.

17. The cellular communication network according to claim 6, wherein the cellular communication network comprises a second generation (2G) cellular communication network and the one or more controllers comprises one or more Base Station Controllers (BSCs).

18. The cellular communication network according to claim 6, wherein the cellular communication network comprises a third generation (3G) cellular communication network and the one or more controllers comprises one or more Radio Network Controllers (RNCs).

19. The cellular communication network according to claim 6, wherein the cellular communication network comprises a fourth generation (4G) cellular communication network and the one or more controllers comprises one or more Evolved Node-Bs (eNBs).

20. The cellular communication network according to claim 19, wherein the core network comprises a Mobility Management Entity (MME) and a System Architectural Evolution (SAE).

21. The method according to claim 1, wherein the first and second cellular communication networks are different types of networks, the type of each cellular communication network being selected from a group consisting of: a second generation (2G) cellular communication network, a third generation (3G) cellular communication network, and a fourth generation (4G) cellular communication network.

22. A method comprising:
   at a first controller, detecting a failure in a core network of a cellular communication network or on an interface between the core network and a radio access network of the cellular communication network, the radio access network having a plurality of cells and one or more controllers, the cells being divided into at least first and second clusters, the core network communicating with the radio access network via the one or more controllers, the first controller being one of the one or more controllers; and
   barring cells of the first and second clusters at different points in time in response to the detection of the failure, comprising:
      barring all cells of the first cluster;
      waiting for a predetermined time period; and
      barring all cells of the second cluster.

23. The method according to claim 22, further comprising:
   at the first controller, determining that the failure in the core network or on the interface between the core network and the radio access network has been resolved; and
   unbarring the barred cells of the radio access network in response to the determination of the resolution of the failure.

* * * * *